Dec. 2, 1969 J. GLASSMAN ETAL 3,481,054
MANUFACTURE OF FOOTWEAR
Filed June 1, 1964 5 Sheets-Sheet 1

INVENTORS:
JOEL GLASSMAN
NEWTON C. TURNER
BY
ATTORNEY,

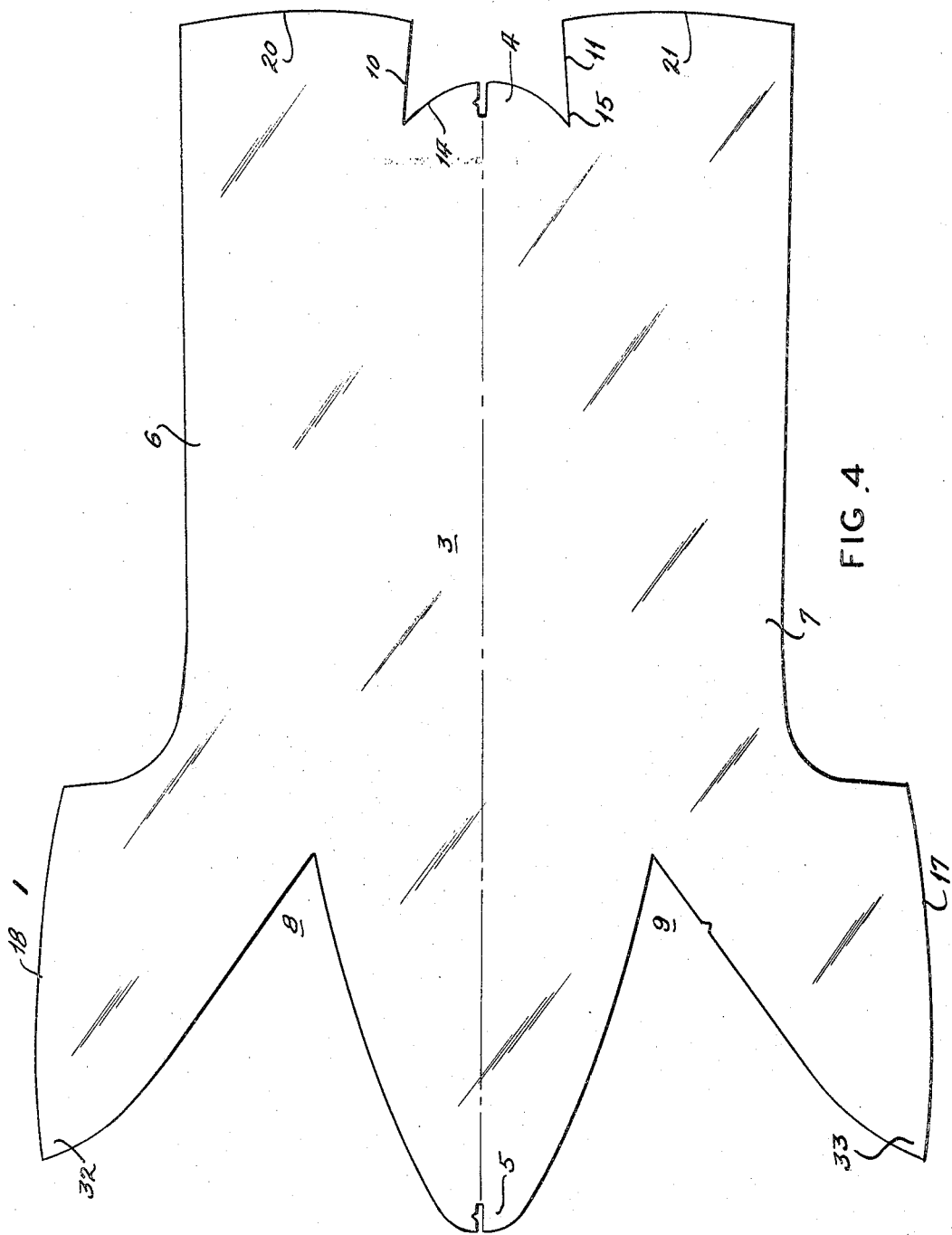

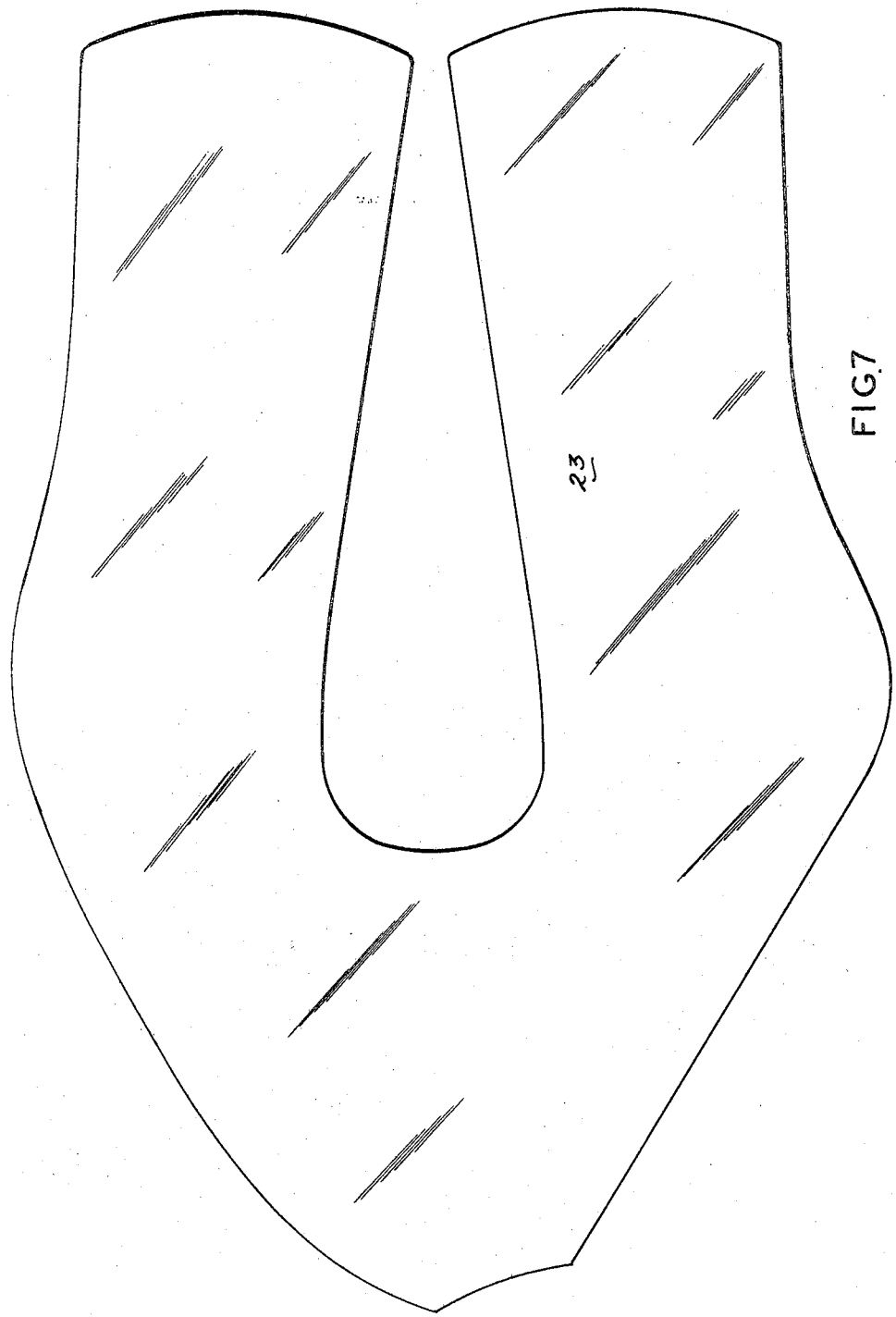

Dec. 2, 1969  J. GLASSMAN ETAL  3,481,054
MANUFACTURE OF FOOTWEAR

Filed June 1, 1964  5 Sheets-Sheet 5

United States Patent Office 3,481,054
Patented Dec. 2, 1969

3,481,054
MANUFACTURE OF FOOTWEAR
Joel Glassman and Newton C. Turner, Nashville, Tenn., assignors to Genesco, Inc., Nashville, Tenn., a corporation of Tennessee
Filed June 1, 1964, Ser. No. 371,301
Int. Cl. A43b 23/07; A43d 7/04, 31/00
U.S. Cl. 36—55                                    7 Claims This invention relates generally to the manufacture of footwear, and particularly to the construction and assembly of the lining of a shoe.

Footwear has been made for so long with patched, seamed, cemented multiplicity of pieces of materials to form linings, that the wearer has assumed that the accompanying lumps, bumps and ridges were necessary and unavoidable evils.

Until this time, the shoe industry has not known how to make shoes without the many components variously known as "vamp linings," "quarter linings," "sock linings," "quarter facings," "counter pockets," "strap linings," and many others. All shoes have at least some of these lining parts in their makeup; some shoes have contained all of them.

Linings serve to conceal counters, hide box toes, cover up insoles, finish top lines. This, the linings have done successfully but at substantial expense, and with the added risk of layers working loose, seams breaking, laps irritating, pieces curling, and wrinkling, and all the ills which which every wearer of shoes is familiar.

The object of the invention is to eliminate or minimize the occurrence of lumps, bumps, ridges, joints, and other irregularities on the inside of a shoe.

The invention contemplates a shoe and a method of making the same which feature a lining of substantially one, single piece of material completely covering the important comfort areas—the interior surfaces of the shoe from the top line on the distal side down across the bottom and up to the top line on the medial side. This one piece serves all the purposes of the common and standard conventional lining systems. It conceals the insole. It provides a space for counter and/or box toe. It covers up tapes and reinforcements. It finishes and strengthens top lines and cut-outs.

Furthermore, the invention involves the concept of conforming one or more pieces of material to the complex curves and shapes comprising the interior of a shoe, without use of lasting machinery or hand labor. The shape is produced by preforming (before assembly with an insole or equivalent) the lining substantially to the shape it will assume in the completed shoe. This may be conveniently accomplished by a unique arrangement of "darts" and configuration which modifies the plane nature of the lining material sufficiently to allow it to follow the contours of the last merely by inserting the last into the partially completed shoe in an assembly operation kindred to sliplasting. It produces a superior lining with the minimum of parts, a minimum of operations, and the combination results in substantial manufacturing economies with improved quality.

While the best expression of the invention involves an integral lining which extends continuously from the top line at the distal side of the shoe down across the bottom and up to the top line at the medial side of the shoe, it is to be understood that such an upper lining can, if desired, be made of a plurality of pieces integrated together so as to extend not only on the inside of the upper, but across the bottom of the shoe at the interior.

An illustrative embodiment of the invention as applied to a women's pump is shown in the accompanying drawings, in which:

FIGURE 4 is a plan view of a pattern for the lining embodied in the shoe of FIGURE 1, or of a flat piece of lining material cut to a contour which, when fitted or closed, results in the one-piece lining of the present invention;

FIGURE 7 is a plan view of the pattern of the upper embodied in the shoe of FIGURE 1;

Figure 1:
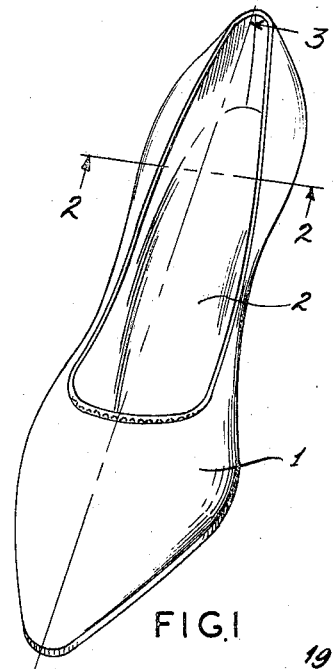
FIGURE 1 is a plan view of a pump embodying the lining of the invention.
Figure 5:
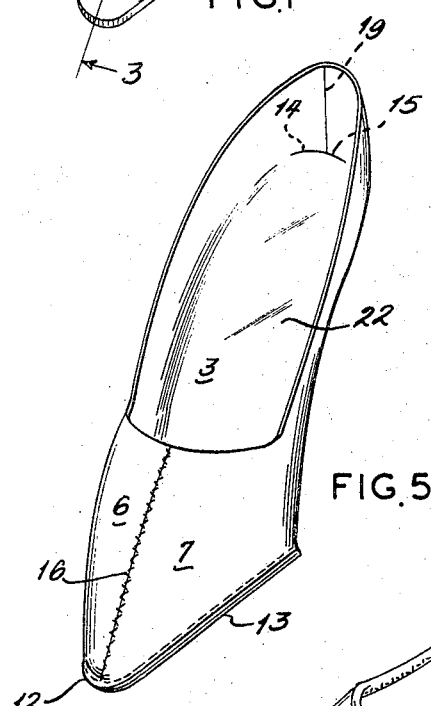
FIGURE 5 is a perspective view, from the top side, of the lining formed by closing the flat piece of lining material shown in FIGURE 4.
Figure 6:
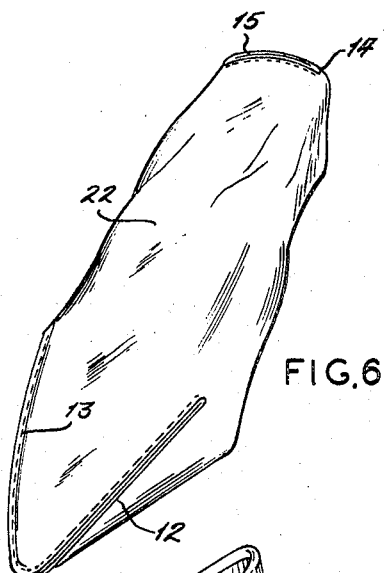
FIGURE 6 is a perspective view, from the bottom side, of the lining formed by closing the flat piece of lining material shown in FIGURE 4.
Figure 8:
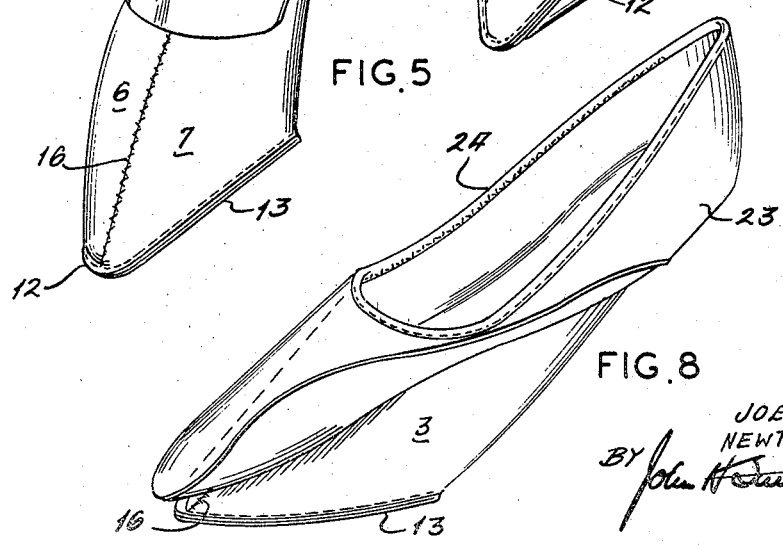
FIGURE 8 is a perspective view of the lining and upper after they have been assembled together, but before being lasted.

Referring first to FIGURE 1 of the drawings, it will be observed that the shoe 1, when viewed through its top opening 2, toward its bottom, reveals no joint, rib or depression corresponding to the edge of a sock liner, or the edge of an insole in the usual shoe. This result is achieved by the utilization of an upper lining made from a pattern of the general type shown in FIGURE 4. Such an upper lining embodies, in one integral or integrated piece 3 of appropriate shoe lining material, a central section having a heel end 4 and a toe end 5 which, in general, corresponds to the size and shape of the interior of the shoe bottom. In the form shown, the lining piece 3 embodies integral side portions 6 and 7, which correspond generally in size and shape to the interior of opposite halves of the shoe upper. In the particular embodiment shown, the lining piece is symmetrical about a line extending from the center of the toe to the center of the heel. Thus, the side portions 6 may be the outside of a right shoe, but the inside of a left shoe, and vice versa for side portions 7. Cut darts 8 and 9 in the toe area separate the central portion from the adjacent side portions 6 and 7, respectively. Similarly, darts 10 and 11 at the heel end separate the central portion from the respective side portions of the lining. Such a lining piece is closed by a line of stitching 12, which draws the sides of dart 8 together; a line of stitching 13, which draws the sides of dart 9 together; a line of stitching 14, which draws the sides of dart 10 together; a line of stitching 15, which draws the sides of dart 11 together; a line of stitching 16, which connects forepart edge 17 of side portion 7 to its counterpart 18 of side portion 6; and a line of stitching 19, which connects together the back margins 20 and 21 of the side portions 6 and 7, respectively, constituting, in effect, a lining back seam. One or all of the aforesaid connections may, if desired, be made, in whole or in part, by adhesive, or other suitable connecting means. The result of so connecting the several parts of lining piece 3 is shown in FIGURES 5 and 6. From FIGURE 6, it will be observed that the central section of the piece 3 has become a bottom lining 22, which takes the place of the ordinary sock lining, and, in addition, eliminates the irregularities which usually exist on the interior of the shoe at or adjacent the side margins of such a sock lining.

Having thus completed the lining, it may be assembled with an appropriate upper of leather, or any other material suitable for shoe uppers. Such an upper 23 may be of the one-piece type, cut according to the pattern shown in FIGURE 7, and is closed at its back seam in accordance with the usual practice. In the embodiment shown, the upper 23 is the conventional long vamp for a pump having an upper which is seamless save at the back seam, but it will be understood that the invention is not limited to any particular form of upper, and such may be made of multiple pieces, if desired. Likewise, such an upper may be, and usually is, equipped with a conventional doubler. In assemblling the preformed lining shown in FIGURES 5 and 6 with a closed upper such as 23, it is preferable to secure the two together only at or adjacent the top line 24, which defines the top opening 2 of the shoe through which a foot is inserted. Such connection may be accomplished by adhesive, or by a line of stitching, or in any other suitable fashion. Preferably, however, at least where the shoe is to be equipped with stiffeners, such as a counter or a box toe, or both, the preformed lining is free of connection with the upper, other than as aforesaid, in the regions where such stiffeners are to be inserted, thereby permitting the application of such stiffeners at the customary stage in shoe manufacture.

Figure 9:
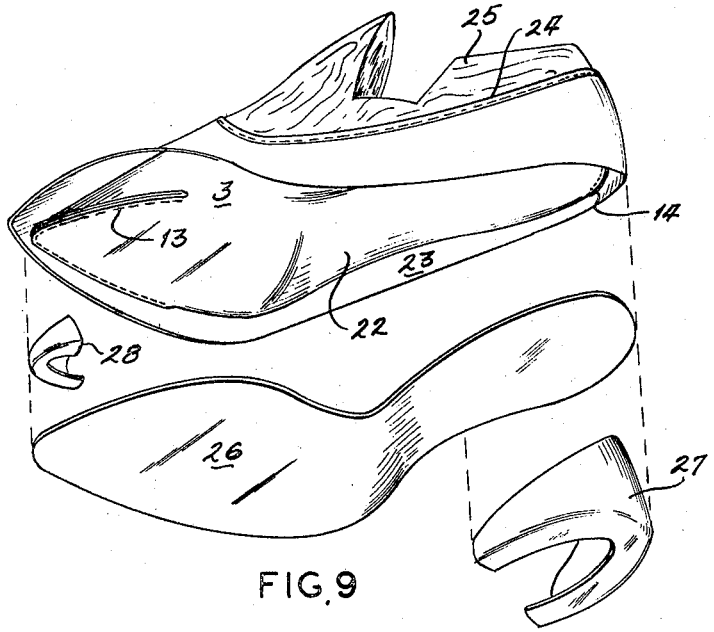
FIGURE 9 is an exploded view of the lasted upper and lining as shown in FIGURE 8, with a typical sole, counter, and box toe ready to be assembled together.

Having assembled the lining and the upper as aforesaid, a last 25 is inserted into the preformed lining, as shown in FIGURE 9, so that the bottom 22 of the preformed lining extends across, and preferably covers, the bottom of the last. Thereupon, an insole, such as 26, is secured to the bottom 22 of the preformed lining as by cementing or, laternatively, the insole 26 may be tacked through bottom 22 to the bottom of the last 25. In either event, stiffeners may now be inserted in accordance with the usual practice. The space between the preformed lining and upper 23 at the heel end provides a counter pocket for the reception of a counter stiffener, such as 27, while the space between the forepart of the vamp 23 and the forepart of the preformed lining provides a pocket for the reception of a box toe, such as 28.

Subsequent lasting and other operations, such as shank positioning and outsole and heel attaching, art preformed in accordance with any of the usual practices, with the exception that, in accordance with the present invention (in contrast with the usual practice), only the upper, and not the upper lining, is lasted over the insole.

Figure 2:
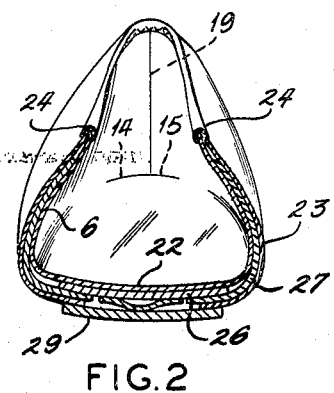
FIGURE 2 is a sectional view taken along line 2—2 of FIGURE 1.
Figure 3:
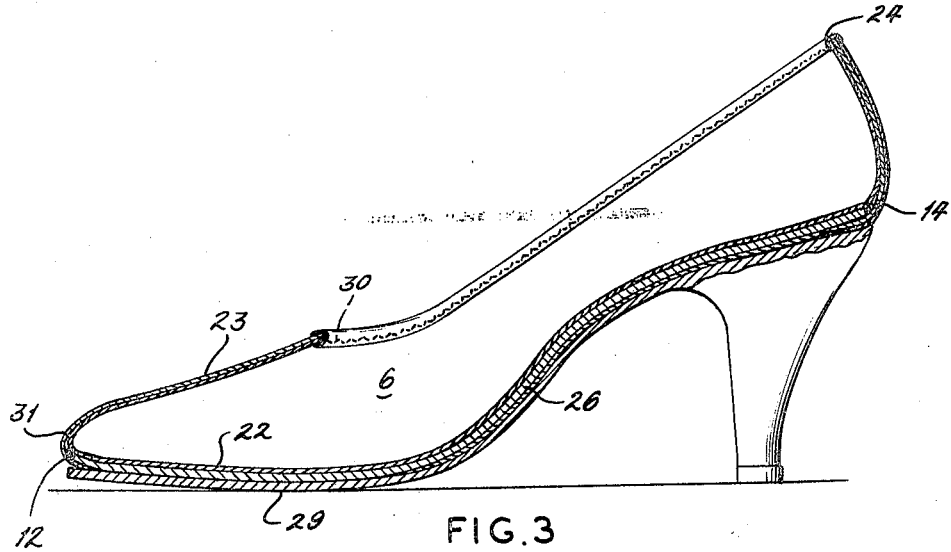
FIGURE 3 is a sectional view taken along line 3—3 of FIGURE 1.

The resultant construction is shown in detail in FIGURES 2 and 3, where it will be observed that the preformed lining, including side portions 6 and 7 and bottom 22, extend without interruption from the top line 24 at one side of the shoe, to the top line 24 at the opposite side of the shoe. Beneath bottom 22 of the preformed lining, insole 26 is in contact therewith and preferably secured thereto as by cementing. The lasting allowance of upper 23 is inturned over the opposite margins of insole 26 with counter 27 located between the insole and the lasting allowance of the upper, and located between the body of the upper and the side portions 6 and 7 of the preformed lining. Outsole 29 is then secured to the lasted shoe bottom in any suitable way.

From FIGURE 2, it is apparent that, in the form of preformed lining shown in the drawings, there is no discontinuity or joint in the material of the lining as it extends from the top line on one side down across the bottom and up the other side. Similarly, as shown by FIGURE 3, there is no discontinuity in the lining as it extends from throat 30 about toe 31 across the insole lengthwise of the shoe to the heel seat and up the back to top line 24 thereat. The expanse of lining material between throat 30 and about the bottom to the back seam at top line 24 is, however, intervened by the stitching, or other means, which connects the forward tips 32 and 33 of side portions 6 and 7, respectively, with the toe portion 5. Likewise, at the heel end 4, the lines of stitching 14, 15 and 21 are interposed. These lines of stitching, or other means of connection, in the lining are preferably made on the side thereof which is unexposed in the finished shoe, as by outseaming with reference to the lining.

Figure 10:
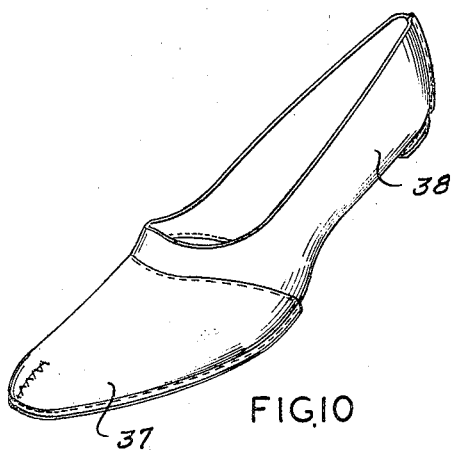
FIGURES 10 through 15 are perspective views of different forms of preformed linings embodying the invention, each being for application to a different type of shoe.
Figure 11:
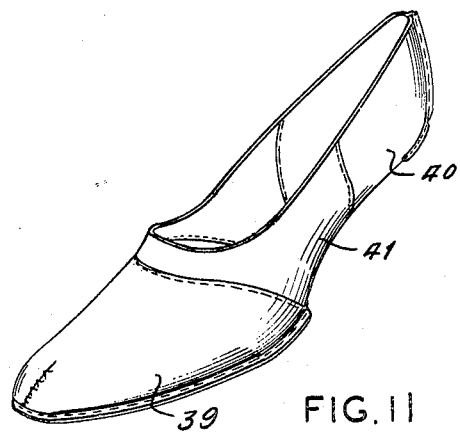

While the construction hereinbefore described is deemed to be the best form of embodying the invention in a pump of the one-piece vamp type, it is to be distinctly understood that the invention is susceptible of many versions which adapt it to the numerous varieties of shoes. For example, the preformed lining may be made of two pieces, as shown in FIGURE 10, one of which, 37, embraces the forepart of the shoe, and another of which, 38, embraces the shank and heel portions of the shoe, but each of said pieces 37 and 38 is provided with its own bottom section. Multiple-piece preformed linings are frequently resorted to for cutting advantage and the resultant economy thereof. A three-piece preformed lining is shown in FIGURE 11, where a vamp lining 39, a quarter lining 40, and an intermediate lining 41, each having a bottom portion integral or integrated with the side portions, are suitably connected together.

Figure 12:
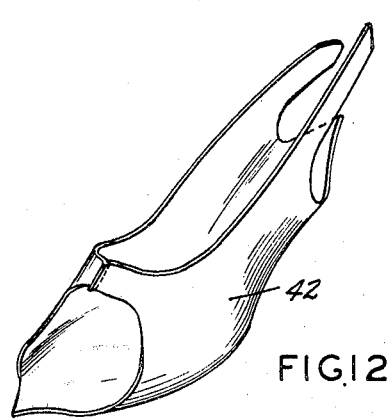
Figure 13:
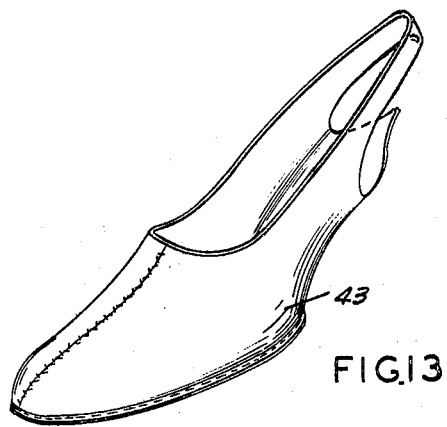
Figure 14:
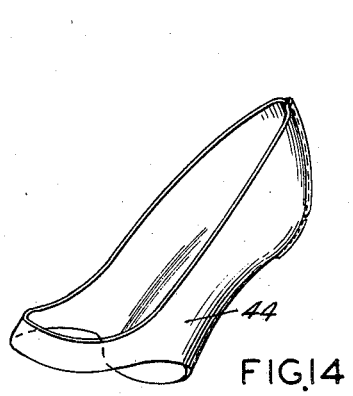
Figure 15:
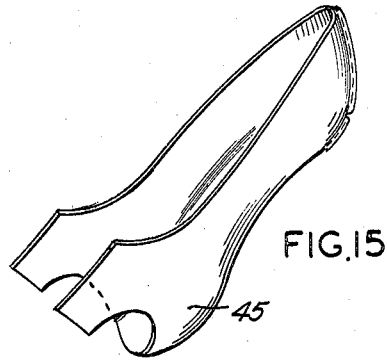

FIGURE 12 represents a preformed lining 42 of the character herein contemplated suitable for an open heel-open toe shoe, while FIGURE 13 depicts a preformed lining 43 suitable for use in a closed toe-open heel shoe. Moreover, there are many shoes where, for one reason or another, a substantial portion is unlined, and FIGURE 14 is typical of a preformed lining 44 embodying the invention for a shoe whose forepart is unlined. FIGURE 15 illustrates a lining 45 embodying the invention in a form suitable for application to the heel part of a handsewn moccasin.

Regardless of the form in which the invention is applied, the materials employed for making the preformed linings which include an integral or integrated bottom are the same as those used for conventional shoe linings. These can be leather, fabrics, or synthetics. As with conventional linings, the material should be soft and formable to permit easy shaping.

The advantages to the wearer of shoes made this way are of three kinds. First, there is the obvious one of "comfort." Freedom from seams can materially reduce discomfort. With the one-piece lining, there is less likelihood of ridges and joints irritating the toes, sides and bottom of feet because there are fewer joints and ridges in the first place. Another comfort feature results from the ease with which cushions and pads can be made as part of the shoe. The uninterrupted lining surface permits ideal location of these components without compromise necessitated by seams and joints in conventional linings.

The second advantage is one of "personal gratification." There is real pleasure in owning and wearing an object which has such innate beauty, the flowing sculptured lines of the unbroken surface of the lining are pleasing to the eye. Then satisfaction ensues when the foot is in a sense, caressed by the conforming, uninterrupted curves of the sleek interior.

There is the third advantage of "service." Of course, there is much less likelihood of deterioration of seams and laps, because there are fewer of them. Sock linings cannot wrinkle or come loose, because there is no sock lining. Less obvious is the benefit of interior cleanliness. With fewer seams, there are fewer crevasses for dirt and perspiration accumulation.

While, in the foregoing description with the aid of the accompanying drawings, a full disclosure of one embodiment of the invention has been made and supplemented by diagrammatic representation of various forms in which the preformed lining of the invention may be provided for shoes of different types, it is not to be understood that the invention is limited to the precise forms disclosed. While, in each of the forms disclosed in detail, the darts in the lining and the closures at extremities have been shown and described as being accomplished by stitching, it is clearly within the purview of the invention to make these connections by other means, as, for example, by adhesive, adhesive tape, or any suitable way. Indeed, the preformed lining can be produced by molding or otherwise forming synthetic plastics to the desired configuration, or by integrating a number of pieces together to produce the desired configuration for the preformed lining, and connecting those pieces together, as by means of heat sealing. Thus, it should be apparent to those skilled in the art that the principles of the present invention are applicable at large to the preparation of linings for all types of shoes, without limitation to the type of materials employed or the manner in which the lining material is connected together, or otherwise preformed substantially to the shape which it will assume in the completed shoe.

Having thus described the invention, what is claimed and desired to be secured by Letters Patent is:

1. In shoe manufacture the process comprising, providing a last having a bottom and an upper portion, providing lining material of plane nature, cutting a blank from said material, said blank integrally embodying:
   (a) a central section corresponding generally to the size of at least a substantial part of the bottom of said last;
   (b) opposite side portions adjacent said central section, each of said portions corresponding generally in size to at least a substantial part of the upper portion of the last;
   (c) cut-outs separating each of the side portions from the central section at at least one longitudinal terminus of the latter;
conforming said blank generally to the shape of said last by:
   (d) connecting the proximate margins of each cut-out together along lines corresponding substantially to the junction between the bottom and the upper portion of said last;
   (e) connecting the remote margins of the respective side portions together adjacent the longitudinal extremities of the blank while leaving such remote margins unconnected for a distance sufficient to delineate a top line about the desired foot opening;
providing an outside upper, connecting the outside upper with the lining blank adjacent said top line, inserting the last into the conformed lining blank with said central section of the lining extending across the bottom of the last and the outside upper draped thereover; and lasting margins of the outside upper over the bottom of the last.

2. The process of claim 1 including the further step of securing an insole to the bottom of the last over said central section prior to lasting the outside upper.

3. A shoe having an insole, an outside upper lasted over the insole, said outside upper circumscribing and defining a foot opening, a counter stiffener having its lower margin lasted over said insole and its upper margin disposed adjacent said foot opening at the heel end of the shoe, and a unitary lining connected to the outside upper about the foot opening therein and adjacent the upper margin of said counter stiffener, but being otherwise free of connection to said shoe for substantially free movement relative to contiguous parts of the shoe, said unitary lining including a bottom portion and opposite side portions intervened by and integral with said bottom portion which extends continuously widthwise of the insole and extends continuously lengthwise of the insole from the heel end thereof toward the toe end thereof for distance at least as great as the corresponding dimension of said foot opening.

4. The shoe of claim 3 wherein said unitary lining is developed from an integral planar blank of shoe lining material having:
   (a) a central section which corresponds to the size and shape of at least that portion of the shoe bottom which extends from the heel end toward the toe end for said distance,
   (b) side parts integral wtih said central section and springing from opposite sides thereof, the respective side portions corresponding generally in size and shape to at least that portion of the interior of opposite halves of said outside upper which extend from the heel toward the toe end for said distance, and
   (c) cut darts separating the central portion from said side parts at the heel end thereof.

5. The shoe of claim 4 wherein said central section and said side parts extend continuously from the heel end to the toe end of the shoe, and wherein other cut darts separate the central portion from the side parts at the toe end thereof.

6. The shoe of claim 4 wherein the margins of said central section and said side parts adjacent said cut darts are connected together by out-seaming.

7. The shoe of claim 5 wherein the margins of said central section and said side parts adjacent said cut darts are connected together by out-seaming.

References Cited

UNITED STATES PATENTS

| 1,604,355 | 10/1926 | Killalee | 36—55 |
| 1,655,397 | 1/1928 | Horne | 36—55 |
| 126,450 | 5/1872 | Drown | 36—10 X |
| 1,018,455 | 2/1912 | Vecchio | 36—55 X |
| 2,442,410 | 6/1947 | Gross | 36—55 X |
| 2,982,033 | 5/1961 | Bingham | 36—55 X |

FOREIGN PATENTS

| 15,756 | 12/1886 | Great Britain. |
| 540,572 | 10/1941 | Great Britain. |

H. HAMPTON HUNTER, Primary Examiner

U.S. Cl. X.R.

12—146, 147